United States Patent [19]

Kikuchi

[11] Patent Number: 4,843,545
[45] Date of Patent: Jun. 27, 1989

[54] COMPILE METHOD USING COPY PROPAGATION OF A VARIABLE

[75] Inventor: Sumio Kikuchi, Machida, Japan
[73] Assignee: Hitachi, Ltd., Tokyo, Japan
[21] Appl. No.: 72,966
[22] Filed: Jul. 14, 1987
[30] Foreign Application Priority Data Jul. 18, 1986 [JP] Japan ............................... 61-167915

[51] Int. Cl.⁴ .............................................. G06F 9/44
[52] U.S. Cl. .................................. 364/300; 364/280.4
[58] Field of Search ...................... 364/200, 300, 900

[56] References Cited

U.S. PATENT DOCUMENTS 4,649,480 3/1987 Ohki et al. ......................... 364/300

FOREIGN PATENT DOCUMENTS 0171592 2/1985 European Pat. Off. .
0171631 2/1986 European Pat. Off. .
1367741 9/1974 United Kingdom .

OTHER PUBLICATIONS

Addison Wesley, "Principles of Compiler Design",1977, pp. 487-489.

British Search Report for British Application Ser. No. 8/16946-dated Aug. 20, 1987.

Primary Examiner—Raulfe B. Zache
Attorney, Agent, or Firm—Fay, Sharpe, Beall, Fagan, Minnich & McKee

[57] ABSTRACT

A compile method to be executed in a digital computer includes the step for detecting among statements in source program codes a first statement defining a first variable and including a polynomial of a plurality of other variables to define the first variable and a second statement including the first variable defined by the first statement so as to use the first variable. The method also includes the steps of judging whether or not the detected second statement satisfies a predetermined copy propagation condition and of replacing the first variable included in the second statement, when a result of the judgement indicates the condition to be satisfied by the second statement, with the polynomial and for eliminating the first statement, with the polynomial anbd for eliminating the first statement. Finally, the method includes the step of generating from a source code after the replacing step object program codes corresponding to the source code.

6 Claims, 5 Drawing Sheets

```
LE   0, B(I)    ⎫
AE   0, C(I)    ⎬ (1)
STE  0, A1      ⎭
LE   0, B(I+1)  ⎫
AE   0, C(I+1)  ⎬ (2)
STE  0, A2      ⎭
LE   0, B(I+2)  ⎫
AE   0, C(I+2)  ⎬ (3)
STE  0, A3      ⎭
LE   0, A1      ⎫
AE   0, A2      ⎪
AE   0, A3      ⎬ (4)
STE  0, Z(I)    ⎭
```

FIG. 2D

```
LE   0, B(I)
AE   0, C(I)
AE   0, B(I+1)
AE   0  C(I+1)
AE   0, B(I+2)
AE   0, C(I+2)
STE  0, Z(I)
```

FIG. 3A $$A = B + C$$
$$\vdots$$
$$X = A * Y$$
$$\vdots$$
$$Y = A * Z$$

FIG. 3B $$X = (B + C) * Y$$
$$\vdots$$
$$Y = (B + C) * Z$$

FIG. 4A

COMMON   P
  ⋮
A = B + C + f(Q)  ----- (1)
----- = -------- + P  ------ (2)
----- = -------- + Q  ------ (3)
X = A * Y             ----- (4)
END

FUNCTION f(Q)
COMMON P
   P = ------
   Q = ------
END

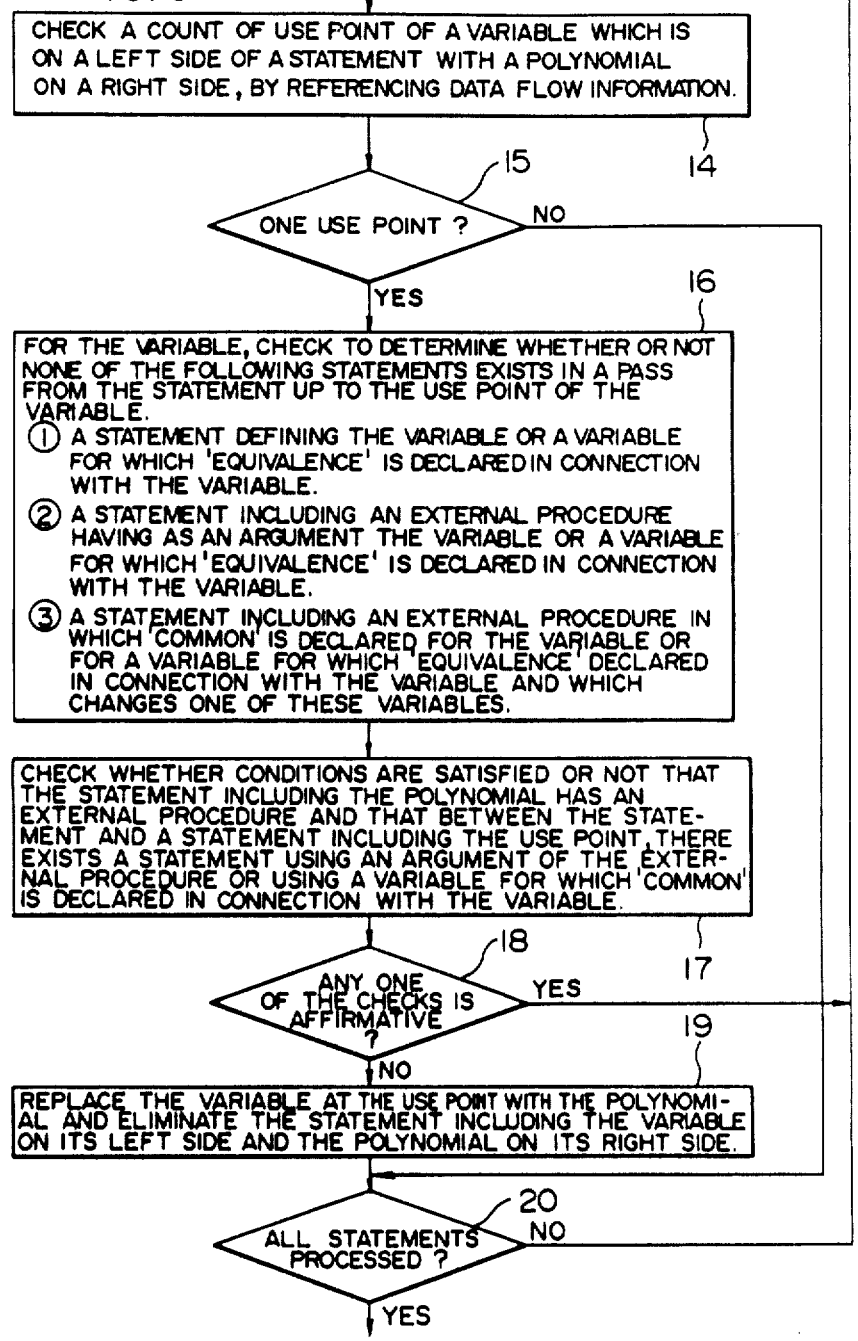

COMPILE METHOD USING COPY PROPAGATION OF A VARIABLE

BACKGROUND OF THE INVENTION

The present invention relates to a compile method for generating object program codes from source program codes in a computer.

Conventionally, in order to increase the execution speed at which an object program is executed in a computer, it has been known to be suitable that the object program code includes a reduced number of variables. To this end, a technology called a copy propagation has been developed as a compiler technology. For details about the copy propagation, refer to, for example, the "Principles of Compiler Design", Addison Wesley, pp. 487–489.

According to the copy propagation, when there exist a first statement and a second statement containing a first variable defined by the first statement to be used by the second statement, the first variable in the second statement is replaced with the right side of the first statement and the first statement is eliminated, thereby deleting the first variable from the source program. According to the paper above, the copy propagation technique is used to eliminate a variable A which is defined only by a single term of a variable B, for example, in $A = B$ presented as the first statement. When the characteristic of the copy propagation technique is taken into consideration, it is desirable to use an expression $A = B + C$ so as to apply the copy propagation technique to the elimination of a variable defined by a polynomial expression of a plurality of variables B and C. Results of study made by the present inventor have shown that when the copy propagation technique is unconditionally used to eliminate a variables defined by a polynomial expression, the execution speed of the object codes generated thereafter in a computer is lowered or the correct result cannot be obtained by the object codes in some cases.

SUMMARY OF THE INVENTION

It is therefore an object of the present invention to provide a compile method in which a variable defined by a polynomial expression including a plurality of variables can be eliminated, thereby generating object program codes of which the execution speed in an actual computer is not lowered.

Another object of the present invention is to provide a compile method in which a variable defined by a polynomial expression including a plurality of variables can be eliminated, thereby generating object program codes of which the execution results in an actual computer are correct.

To this end, according to the present invention, there is provided a predetermined condition determining whether or not the deletion of the variable can be effected and the elimination of the variable is achieved after it is judged whether a variable as an object of the deletion satisfies the condition or not. More concretely, the first condition is that the first variable defined by a polynomial expression in the first statement is used only once by the second statement. The second condition is that there does not exist a statement changing the value of the variable between the first statement and the second statement.

BRIEF DESCRIPTION OF THE DRAWINGS

The present invention will be apparent from the following detailed description taken in conjunction with the accompanying drawings in which:

FIG. 2A is a schematic diagram showing an example of a conventional source program;

FIG. 2B is a diagram illustrating an example of a source program obtained by modifying the source program of FIG. 2A according to the compile method of the present invention;

FIG. 2C is a schematic diagram showing object program codes generated from the source program according to the conventional compile method;

FIG. 2D is a diagram illustrating object program codes generated from the source program of FIG. 2B;

FIG. 3A is a schematic diagram showing an example of another source program;

FIG. 3B is a diagram illustrating a source program attained by executing a copy propagation processing on the source program of FIG. 3A;

FIG. 4A is a schematic diagram showing an example of still another source program;

FIG. 4B is a diagram illustrating a source program obtained by effecting a copy propagation processing on the source program of FIG. 4A;

FIG. 5 is a flowchart showing in detail the copy propagation processing of a polynomial expression in the processing flowchart of FIG. 1 according to the present invention.

DESCRIPTION OF THE PREFERRED EMBODIMENTS

Referring to the accompanying drawings, description will be given of embodiments according to the present invention.

The compiler according to the present invention is executed to generate an object program in a computer, for example, the general-purpose computer M680 put to the market by the assignee of the present invention which has registers such as a general register and a floating-point register to keep data to be subjected to an operation and a temporary result of an operation and in which for an execution of an operation, data is read from a memory to be kept in a register and the operation is effected between the memory and the register or between the register and another register; moreover, the object program thus generated is suitable for an execution in the computer described above.

Figure 6:
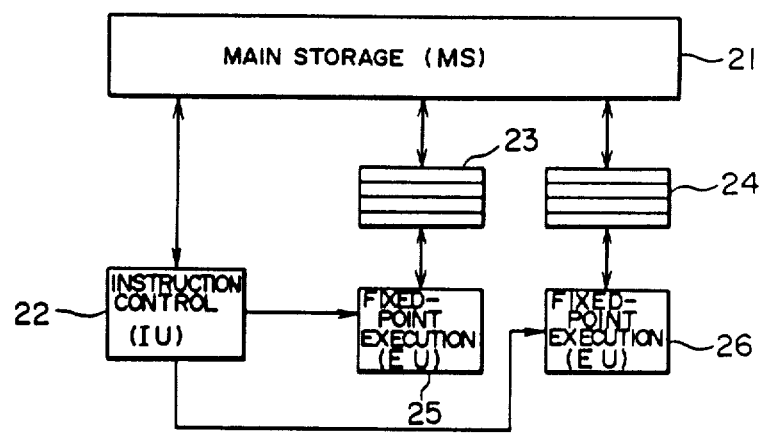
FIG. 6 is a schematic block diagram illustrating a digital computer in which an object program generated according to the present invention is executed.

FIG. 6 is a schematic configuration diagram of a digital computer in which an object program generated by the compiler is executed. In the configuration, a main storage 21 is used to store machine instructions and data, which are accessed from an instruction control unit 22 and execution units 25–26. The instruction control unit 22 effects preparation for an execution of an instruction, for example, a preread of an instruction and a prefetch of an operand to increase the speed of the instruction execution. The fixed-point execution unit 25 and the floating-point execution unit 26 control a fixed-point register 24 and a floating-point register 23, respectively so as to execute operations at a high speed.

Figure 1:
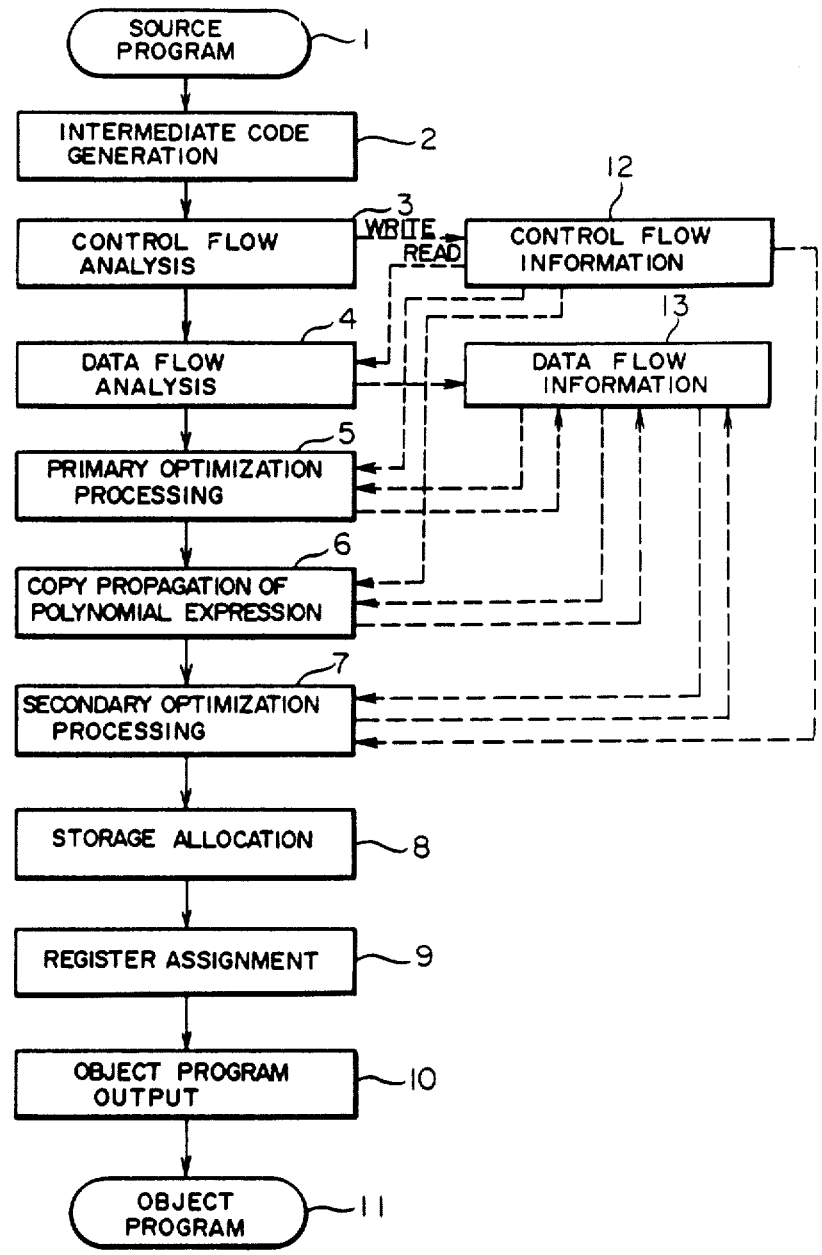
FIG. 1 is a flowchart of the compile method according to the present invention.

In FIG. 1, an intermediate code generation 2 interprets statements of a source program 1 to generate intermediate codes. A control flow analysis 3 processes the intermediate codes to obtain therefrom sets called basic blocks each including successive codes not having a branch nor an entry of a jump thereto, analyzes the flow of control in the basic blocks, and outputs the results as control flow information 12. A data flow analysis 4 gathers information related to definitions and uses of variables. A primary optimization processing 5, a secondary optimization processing 7, and a copy propagation of polynomial expression 6 effect an optimization of the intermediate codes based on above-mentioned control flow information 12 and data flow information 13. The optimization includes, for example, a common expression eliminate processing in which when a plurality of the same operations are to be executed, only the first operation is effected and the subsequent operations are replaced with the result of the first operation and a dead code eliminate processing to eliminate unnecessary statements. In a storage allocation 8, main storage addresses are allocated to data appearing in the intermediate codes. A register assignment 9 determines for data appearing in the intermediate codes registers to keep the value of the data. An object program output 10 generates machine instructions, achieves an optimization on the machine instructions, and then outputs the results.

Referring now to FIG. 5, the processing of the copy propagation of polynomial expression 6 will be described in conjunction with the source program of FIG. 2A as an example. For a variable in the left side of a statement, e.g. like a statement (1) of FIG. 2A, of which the right side includes a polynomial of a plurality of variables (including a case where only array elements are included) (the variable is to be referred to hereinbelow as a variable defined by the statement or the polynomial; for example, a variable A1 in the case of FIG. 2A), a usage count check part 14 references data flow information 13 to check for the number of use points of the variable defined by the polynomial. A use point indicates, when a subsequent statement includes a variable identical to the variable associated with the use point so as to use the value of the variable, a position of the statement and a position of the variable in the statement. Data flow information 13 includes information of the statements defining or using the variables appearing in the intermediate codes, use positions in the respective statements, and definition-use relationships; namely, information indicating which one of the statements uses which one of the variables. In a judgement part 15, based on this information, if the number of use points of the variable (e.g. A1) defined by the polynomial expression is one, a variable definition check part 16 is effected. If a plurality of uses are detected, the variable is assumed not to be subjected to the copy propagation of polynomial expression 6 and hence the similar processing is executed for the subsequent statement because of the following reason. If the copy propagation is effected when there exist a plurality of use points, the execution speed of an object program to be generated thereafter is lowered. For example, in the case of the source program of 3A, the variable A defined by the polynomial expression is used for the definitions of other variables X and Y. If the copy propagation is achieved for the source program of FIG. 3A, a source program of FIG. 3B is obtained. As a result, an addition B+C is required to be effected twice, namely, the number of additions required is increased as compared with the case of FIG. 3A. Consequently, in this embodiment, the copy propagation is not effected unless the number of uses is one.

The variable definition check part 16 executes processing as follows. First, a check is made to determine that between a first statement in which a variable is defined by a polynomial expression and a second statement using the variable, there does not exist a statement which changes the value of the variable. For example, in FIG. 2, the statements in a pass from a statement (1) to a statement (3) are checked with reference to data flow information 13 to determine whether or not there exists a statement which changes the value of the variable (e.g. A1). For the statements between the first statement and the second statement, it is checked whether or not the following conditions are not satisfied (part 16). (1) There exists a statement defining the variable or a variable for which an EQUIVALENCE declaration is specified with respect to the variable. (2) There exists a statement including an external procedure having any one of the variables as an argument. (3) There exists an external procedure including a statement in which a COMMON declaration is specified for any one of the variable is included and the value of the variable is changed. Furthermore, for both of the first and second statements, it is checked whether or not the following condition is satisfied (part 17). (4) There exists an external procedure in the first statement; moreover, between the statement and the second statement, there exists a statement using an argument of the function or a statement using a variable for which a COMMON declaration is specified.

In a judgement part 18, if any one of the conditions is satisfied, the variable defined by the polynomial is assumed not to be subjected to the copy propagation; whereas, if neither conditions are satisfied, the propagation is effected. As described above, since the copy propagation is achieved after the variable definition check is finished, the copy propagation can be suppressed in a case where the execution results of a program obtained by the copy propagation differs from that of a program for which the copy propagation is not effected. For example, in the case of a source program of FIG. 4A, a COMMON declaration is specified for a variable P, the variable P is updated during an execution of a function f in a statement (1), and the value obtained by the update is used by a sentence (2). In addition, a variable Q is used as an argument of the function f, the variable Q is updated by an execution of the function f of the statement (1), and the updated value is used by a statement (3). In such a case, if the copy propagation is effected on the variable A of the statement (1) so as to propagate the variable A to a statement (4), a source program of FIG. 4B is obtained. In this case, however, for the variables P and Q respectively of the statements (2) and (3), the values determined before an execution of the function f are used, which leads to a wrong result.

In a propagation/elimination part 19, the variable defined by the polynomial in the second statement is replaced with the polynomial above and then the first statement is eliminated. In a judgement part 20, the processing described above is executed for all statements. As a result, the source program of FIG. 2A is converted into the source program of FIG. 2B.

According to the present embodiment, since the variable defined by an assignment is eliminated, the value obtained as a result of an execution of the assignment need not be kept in the memory or a register so as to be used later. At the propagation destination, an operation of a polynomial is executed and hence when the result of each binomial operation is accumulated in a register, an operation between the memory and the register is enabled, which leads to an effect that the number of registers to be used can be reduced. Moreover, in general, when the definitions and uses of a value exist in a plurality of statements, a value obtained is kept in a register for the use thereafter to increase the execution speed; consequently, a scheme is used to keep in registers as many variables as possible. However, since the number of registers is finite, the registers become to be insufficient in this case during the operation. When the registers become insufficient, a value kept in a register is saved into the memory to use the register for another purpose. In a case where the saved value is to be used later, if an operation with the memory cannot be effected, the value is loaded in a register again. As described above, by reducing the number of values to be kept in registers, the instructions to save the values to the memory and to load the values from the memory into registers can be minimized; consequently, the number of instructions to be executed is reduced, which also leads to an effect that the execution efficiency is improved. FIGS. 2C-2D respectively show a sequence of instructions in an object program obtained from a source program shown in FIG. 2A when the present invention is not applied thereto, and a sequence of instructions obtained from the source program when the present invention is applied thereto, that is from the source program shown in FIG. 2B. In FIGS. 2C and 2D, LE, AE and STE shows mnemonics of instructions called LOAD instructions, ADD Normalized instructions and STORE instructions. For example, in the instruction series (1), the first instruction LE 0, B(I) shows a LOAD instruction which requires loading of an operand B(I) from a main storage into one of floating-point registers of a serial number of zero. The second instruction AE 0, C(I) shows an ADD instruction which requires addition of a first operand held by the floating point register of a serial number of zero and a second operand C(I) held in the main storage so as to write the result of the addition into the same register. The third instruction STE 0, A1 is a STORE instruction which requires storing of an operand held in the same register into the main storage as an operand A1. According to FIG. 2C, since A1, A2, and A3 are used by instruction series (4), the values of A1, A2, and A3 are saved in the memory when the instruction series (1)-(3) are executed, A1 is loaded in a floating-point register No. 0 by the instruction series (4), and then the operation is executed between the register No. 0 and the memory in which A2 and A3 are beforehand saved. In case of FIG. 2D, after B(I) is once loaded from the memory into the floating-point register No. 0, the operation between the register No. 0 and the memory is enabled. As a result, the 13 instructions required in the former can be reduced to 7 instructions in the latter to which the present invention is applied.

According to the present invention, since the variable defined by an assignment is eliminated, the value obtained as a result of an execution of the assignment need not be kept in the memory or a register so as to be used later. At the propagation destination, an operation of a polynomial is executed and hence when the result of each binomial operation is accumulated in a register, an operation between the memory and the register is enabled, which leads to an effect that the number of registers to be used can be reduced. In addition, the statement to be subjected to the copy propagation is eliminated, which leads to an effect that the items to be kept in registers are minimized and hence the registers are not likely to become insufficient.

While the present invention has been described with reference to the particular illustrative embodiments, it is not restricted by those embodiments but only by the appended claims. It is to be appreciated that those skilled in the art can change or modify the embodiments without departing from the scope and spirit of the invention.

We claim:

1. A compile method to be effected in a digital computer comprising the following steps of:
   (a) detecting among statements in source program codes to be compiled a first statement defining a first variable by a polynomial of a plurality of other variables and a second statement including the first variable so as to use the first variable defined by the first statement;
   (b) judging whether or not the detected second statement satisfies a predetermined copy propagation condition;
   (c) replacing the first variable included in the second statement by the polynomial and eliminating the first statement, when a result of the judgement indicates the condition is satisfied by the second statement; and
   (d) generating object program codes from source program codes after said step (c).

2. A compile method according to claim 1 wherein said copy propagation condition is that the first variable defined by the first statement is used only once by the second statement and not by another statement.

3. A compile method according to claim 1 wherein said copy propagation condition is that statements to be executed between the first statement and the second statement do not include a statement changing a value of the first variable.

4. A compile method according to claim 1 further including
   a step for converting the source program codes to be compiled into intermediate codes corresponding thereto,
   said steps (a)-(d) using the intermediate codes in place of the source program codes to be compiled.

5. A compile method according the claim 1, wherein said copy propagation condition is that statements to be executed between the first statement and the second statement do not include a statement changing any value of variables included in the polynomial.

6. A compile system to be effected in a digital computer comprising:
   (a) means for detecting among statements in source program codes a first statement defining a first variable and including a polynomial of a plurality of other variables to define the first variable and a second statement including the first variable defined by the first statement in order to use the first variable defined by the first statement;
   (b) means for judging whether or not the detected second statement satisfies a predetermined condition, said means for judging being connected to said means for detecting;
   (c) means for replacing the first variable included in the second statement, when a result of the judgement indicates the condition to be satisfied by the second statement, with the polynomial and eliminating the first statement, wherein said means for replacing is connected to said means for judging; and (d) means for generating from a source code, after the elimination has taken place, object program codes corresponding to the source code wherein said means for generating is connected to said means for replacing.

* * * * *